Figure 1:
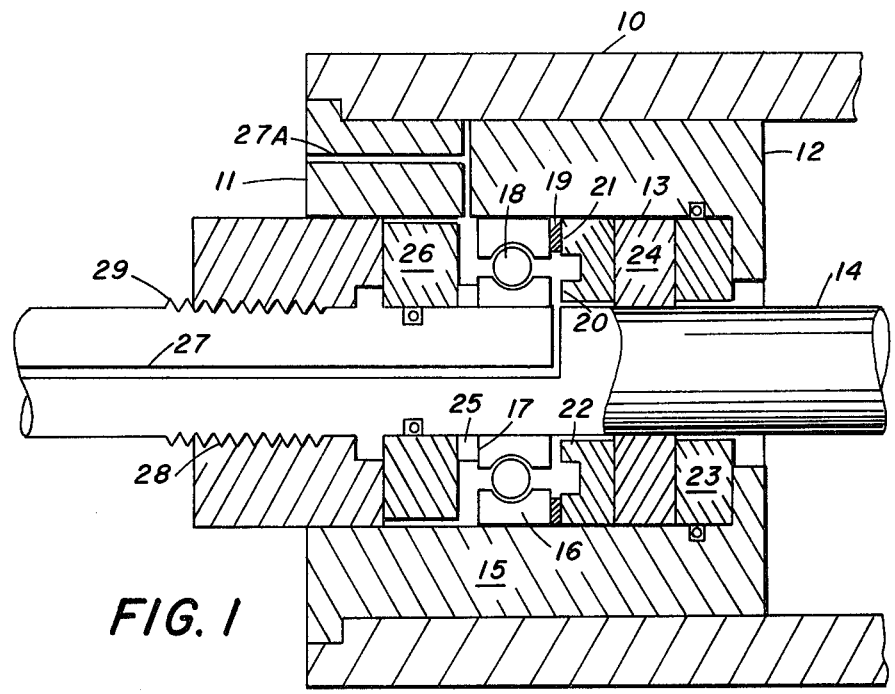

United States Patent [19]  [11] 4,043,616

Zimmer  [45] Aug. 23, 1977

[54] BEARING CARTRIDGE ASSEMBLY

[76] Inventor: Aaron Zimmer, 6476 Monitor St., Pittsburgh, Pa. 15217

[21] Appl. No.: 690,416

[22] Filed: May 27, 1976

[51] Int. Cl.² .............................. F16C 33/82
[52] U.S. Cl. .................... 308/36.3; 308/10; 308/187
[58] Field of Search ........... 308/36.3, 9, 78, 122, 308/10, 187

[56] References Cited

U.S. PATENT DOCUMENTS

| 3,746,407 | 7/1973 | Stiles et al. ............ 308/36.3 |
| 3,834,775 | 9/1974 | Tuffias ................. 308/36.3 |
| 3,977,739 | 8/1976 | Moskowitz ............. 308/187 |

Primary Examiner—Joseph F. Peters, Jr.
Assistant Examiner—Gene A. Church
Attorney, Agent, or Firm—Buell, Blenko & Ziesenheim

[57] ABSTRACT

A bearing cartridge assembly or conveyor rolls or the like comprises a bearing structure, a fluid lubricant containing particles of magnetizable material disposed within the bearing, and permanent magnet lubricating means disposed adjacent the bearing elements but separate therefrom so as to establish magnetic flux paths between the bearing elements through the fluid lubricant, whereby the lubricant is distributed uniformly over the bearing surfaces by magnetic attraction.

15 Claims, 10 Drawing Figures

BEARING CARTRIDGE ASSEMBLY

This invention relates to magnetic fluid shaft bearings suitable for conveyor rolls and the like. It is more particularly concerned with such bearings having magnetic means adapted to distribute a ferrofluidic lubricant uniformly over the bearing surface and with conveyor roll assemblies of such bearings.

A considerable number of magnetic fluid or ferrofluidic bearings, so called, has been devised and patented, as are exemplified in the following U.S. Pat. Nos.: Stiles, 3,439,961, issued Apr. 7, 1967; Rosensweig, 3,612,630, issued Oct. 12, 1971; Rosensweig, 3,620,584, issued Nov. 16, 1971; Rosensweig, 3,734,578, issued May 22, 1973; Miskolczy, et al., 3,740,060, issue June 19, 1973; Stiles, et al., 3,746,407, issued July 17, 1973 and Tuffias, et al., 3,834,775, issued Sept. 10, 1974.

The bearings there described are generally journal bearings, intended for low friction applications, or for apparatus requiring a pressure seal across the bearing. The load-carrying capacity of such bearings is usually not great so that the problem of lubricant distribution across the bearing surface does not arise. The known advantages of ferrofluidic bearings make them attractive for other applications, for example, bearings for conveyor rolls used in coal conveyors and the like which must be sealed against abrasive particles in the surrounding atmosphere. Here, however, the bearings must carry heavy loads and are not easy of access in place, and so must operate without attention for long periods of time.

It is an object of my invention, therefore, to provide a ferrofluidic bearing having uniform distribution of lubricant across bearing surfaces of substantial extent. It is another object to provide such a bearing employing anti-friction bearing elements. It is another object to provide such a bearing, shaft and additional apparatus in cartridge form which fits into the ends of a conveyor roll shell. It is a further object to provide a conveyor roll embodying such a cartridge. Other objects of my invention will appear in the course of the description thereof which follows.

The bearing element of my invention comprises a shaft bearing, journal or anti-friction, provided with a magnet or magnets associated with the bearing and disposed to establish magnetic flux paths between the bearing elements and across the bearing cavity so as to distribute a lubricant containing particles of uniformly magnetizable material over the bearing cavity by magnetic attraction. With journal bearings the magnets may be, but need not be, embedded in the bearing elements or the shaft. With anti-friction bearings the magnets are associated with the anti-friction bearing mechanism but are not embedded therein.

Figure 2:
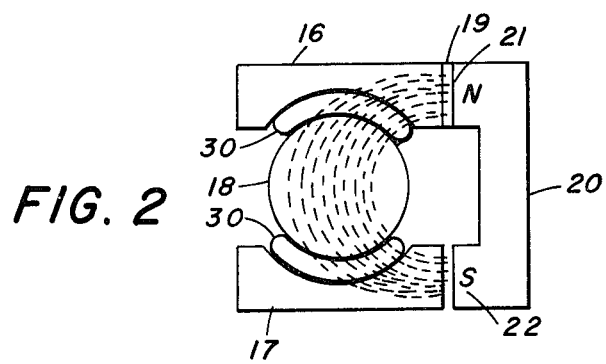
Figure 3:
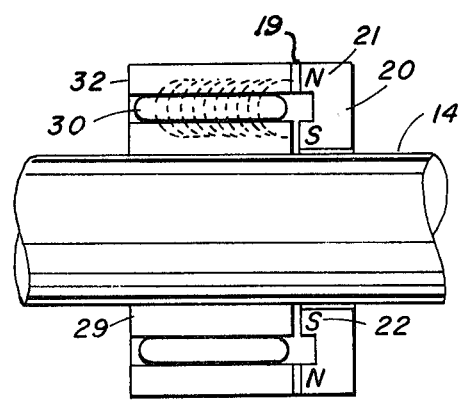
Figure 4:
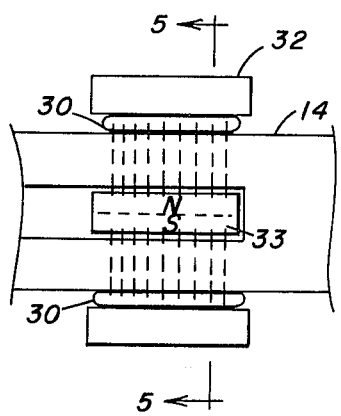
Figure 5:
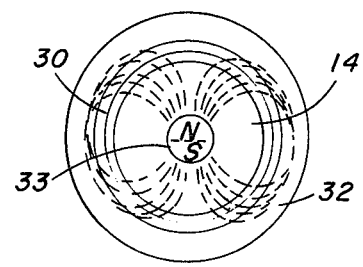
Figure 6:
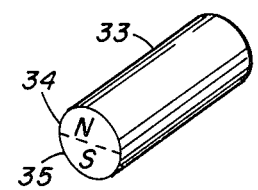
Figure 9:
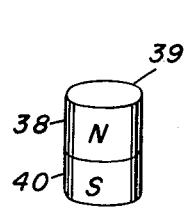
Figure 7:
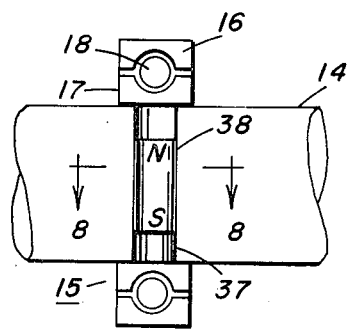
Figure 8:
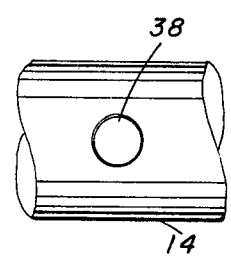
Figure 10:
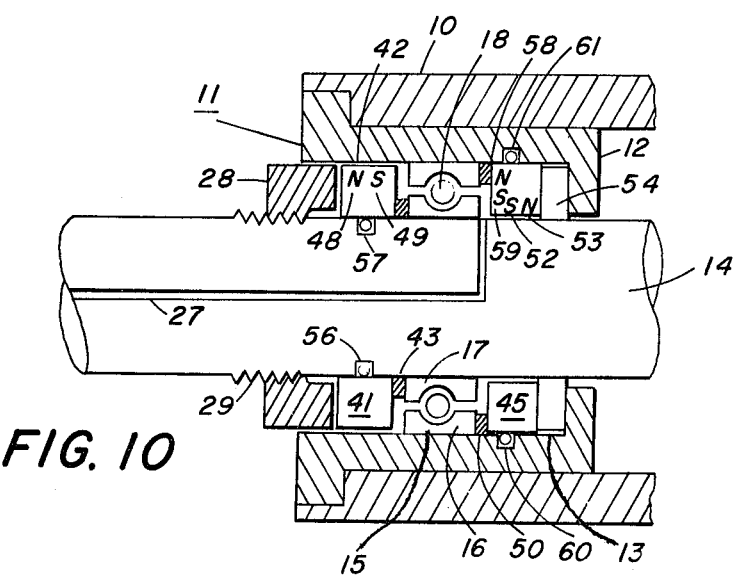

Embodiments of my invention presently preferred by me are illustrated in the attached figures, to which reference is now made:

FIG. 1 is an axial cross section through one end of a conveyor roll fitted with an anti-friction bearing cartridge of my invention, FIG. 2 is an enlarged cross section of a portion of the anti-friction bearing and magnet of FIG. 1 showing the magnetic flux paths and lubricant distribution across the bearing cavity, FIG. 3 is an axial cross section of a shaft and journal bearing of my invention otherwise similar to the bearing of FIG. 1, FIG. 4 is an axial cross section of another embodiment of a shaft and journal bearing of my invention showing the flux paths and lubricant distribution across the bearing, FIG. 5 is a diametral cross section of the bearing of FIG. 4 taken on the plane 5—5, thereof, FIG. 6 is a perspective view of magnet 33, FIG. 7 is an axial cross section of an anti-friction bearing with a somewhat different embodiment of magnet of the type shown in FIGS. 4 and 5, FIG. 8 is a horizontal section through the shaft of the bearing of FIG. 6 taken on the plane 8—8 thereof, FIG. 9 is a perspective view of magnet 38, and FIG. 10 is an axial cross section of another embodiment of the bearing cartridge of FIG. 1.

In FIG. 1 a conveyor roll shell 10 is fitted at one end with a bearing cartridge 11 comprising a cylindrical housing 12 dimensioned to fit inside shell 10. Housing 12 has a central cylindrical cavity with an inside wall 13 of diameter greater than the diameter of roll shaft 14, which is centrally positioned in the cavity by an anti-friction bearing 15. That bearing comprises an outer race 16 which fits against wall 13 and an inner race 17 which fits against shaft 14. Between races 16 and 17 are positioned bearing balls 18 which roll thereon. Like other anti-friction bearings, bearing 15 is provided with a cage or retainer for bearing balls 18, but this is omitted from the figure for the sake of clarity. The shaft 14 of a conveyor roll is stationary so that race 17 is stationary and race 16 rotates with respect thereto.

Adjoining one end face of anti-friction bearing 15 is an annular permanent magnet 20 fitting within wall 13 and surrounding shaft 14, but clearing it so that magnet 20 rotates with race 16. Magnet 20 has an outer annular pole 21 shown as a north pole in FIG. 2 and an inner annular pole 22 shown as a south pole. Pole 21 fits against spacer ring 19 which, in turn, abuts race 16, but pole 22 clears race 17, the clearance being only sufficient to permit relative rotation therebetween.

Adjoining the other end face of magnet 20 is a conventional damping or shock absorbing mechanism 24 which may be mechanical or hydraulic. Between damper 24 and the inner end of housing 12 is a cylindrical seal 23 sealing shaft 14 to housing 12. This seal, which rotates with housing 12, may be of any known type, including a magnetic fluid seal. Abutting the other end of bearing race 17 through spacer ring 25 is a second seal 26 which may be of the same type as seal 23, but which is stationary. The elements above mentioned comprising bearing cartridge 11 are assembled in housing 12 by screwing internally threaded sleeve 28 onto an externally threaded portion 29 of shaft 14. Sleeve 28 is screwed down to impose a predetermined load on damping element 24. An axial bore 27 and cross bore in shaft 14 leads from the outer end of the shaft to the space between bearing 15 and magnet 20, allowing the introduction therethrough of ferrofluidic lubricant to that bearing. An alternative bore 27a is also shown, leading from the outer face of housing 11 through a cross bore therein to the space between bearing 15 and seal 26.

As may be seen from FIG. 2, bearing races 16 and 17 act as pole pieces for magnet 20. The flux paths as shown pass through the air gaps between the bearing balls 18 and the races 16 and 17 as well as the small gap between relatively rotating race 17 and magnet pole 22. The distribution of flux paths across the cavity in bearing 15 is reasonably uniform and the ferrofluidic lubricant 30 is thus distributed substantially uniformly in the bearing cavity.

Although I have described and illustrated bearing 15 as an anti-friction bearing, it is evident that it could be a journal bearing, as shown in FIG. 3. Inner cylindrical bearing element 29 is affixed to shaft 14. Outer cylindrical bearing element 32 surrounds inner element 29 but is spaced therefrom to provide a bearing cavity therebetween. Against one end of the bearing is positioned annular permanent magnet 20 having an outer annular pole 21 abutting an end of outer bearing element 32 and an inner annular pole 22 spaced from an end of inner bearing element 29 just sufficiently to permit relative rotation therebetween. As shown, magnet 20 establishes flux paths from element 32 to element 29 across the cavity therebetween. The flux paths extend out from magnet 20 toward the other end of the bearing and hold ferrofluidic lubricant 30 in the bearing cavity by magnetic attraction. It is evident that a second magnet 20 can be positioned at the other end of the bearing elements if desired.

FIG. 4 represents in axial cross section, the elements of another embodiment of my invention and FIG. 5 is a diametral cross section therethrough. Shaft 14 comprises the inner bearing element and sleeve 32 comprises the outer element. In an axial hole in shaft 14 is positioned a cylindrical magnet 33 which is magnetized crossways of shaft 14 with a north pole 34 and south pole 35 as are shown in FIG. 6. The flux paths as shown in the Figures bring about uniform distribution of ferrofluidic lubricant 30 in the bearing cavity. It will be seen from FIG. 4 that if magnet 33 is substantially the length of the bearing cavity, axially of the shaft, the axial lubricant distribution will be quite uniform no matter how long that cavity may be. Thus, an elongated bearing may be constructed in this fashion for heavy loads.

The embodiment of FIGS. 7 and 8 comprises shaft 14 provided with an anti-friction bearing 15 as in FIG. 1. Shaft 14 is formed with cylindrical cross bore 37, the ends of which adjoin race 17 of bearing 15, and in cross bore 37 is fixed a cylindrical magnet 38, magnetized lengthwise of its axis with a north pole 39 and a south pole 40, as are shown in FIG. 9. The magnet 38 acts to distribute the lubricant uniformly in bearing 15 in the same way as magnet 33 previously described.

In the embodiments of FIGS. 4 through 8, it is desirable to utilize high magnetic field intensity permanent magnets. A considerable number of such magnets is disclosed in U.S. Pat. No. 2,676,777 issued to J. J. Went et al., on Sept. 11, 1956. Those magnets have high intrinsic coercive force and fairly high values of magnetic remanence. They are not demagnetized even when surrounded by iron of high permeability and may be magnetized before being assembled into the bearings of my invention.

The embodiment of my invention illustrated in FIG. 10 is a bearing cartridge utilizing a permanent magnet adjacent the bearing to provide uniform lubrication therein as has been described herein and the same permanent magnet body to provide a magnetic seal or barrier between the elements of the bearing cartridge to exclude foreign substances from the bearing. As before, a cylindrical housing 12 dimensioned to fit within a conveyor roll shell 10 forms a cartridge assembly 11 with the shaft 14. Shaft 14 is centrally positioned within housing 12 by an anti-friction bearing 15 having an outer race 16 which fits against inner wall 13 of housing 12 and inner race 17 which fits against shaft 14. Between races 16 and 17 are positioned bearing balls 18 which roll thereon.

Adjoining the outer end of bearing 15 is an annular permanent magnet 41 which is sealed to shaft 14 by an O-ring 56, positioned in a circumferential groove 57 in shaft 14. On the outer surface 42 of magnet 41, which surface clears the inner surface 13 of housing 12 sufficiently to allow relative rotation therebetween, is a pair of annular poles 48 and 49. The inner end face of magnet 41 abuts a spacing ring 43 which in turn abuts inner race 17 of bearing 15. Ring 43 provides clearance between the inner end face of magnet 41 and the outer bearing race 16 so as to permit relative rotation therebetween.

Adjoining the inner end of bearing 15 is an annular permanent magnet 45 which is sealed to housing 12 by an O-ring 60 positioned in a circumferential groove 61 in the inner wall 13 of housing 12. On the end face of magnet 45 adjacent bearing 15 is a pair of coaxial coplanar annular poles 58 and 59. Pole 58 is opposite the end of outer bearing race 16 and is spaced therefrom by a magnetizable spacer ring 50. The space so provided is sufficient to permit relative rotation between magent pole 59 and the end of inner bearing race 17. On the inner circumference of magnet 45, which clears shaft 14, is a pair of annular poles 52 and 53, pole 52 being of the same polarity as adjoining pole 59. Magnet 45 is spaced from the inner end of housing 12 by a ring 54 of shock absorbing or damping material. As before, the elements of the cartridge are assembled by screwing internally threaded sleeve 28 over an externally threaded portion 29 of shaft 14 to impose a predetermined load on damping ring 54. An axial bore 27 and cross bore in shaft 14 lead from the outer end of the shaft to the space between bearing 15 and magnet 45, allowing the introduction therethrough of ferrofluidic lubricant to that bearing.

Permanent magnet 45 and the method of magnetizing it are fully described in my copending patent application entitled, SURFACE POLE MAGNET Ser. No. 683,075, filed May 4, 1976. Poles 58 and 59 on the end face act to maintain uniform distribution of the ferrofluidic lubricant in bearing 15 in the same way as poles 21 and 22 of magnet 20 in the embodiment of FIG. 1 previously described herein. Poles 52 and 53 on the inner circumference of magnet 45 hold the ferrofluidic lubricant in the clearance space between magnet 45 and shaft 14 so as to form a seal or barrier in the same way as the magnets of the prior art patents previously mentioned.

Magnet 41, if desired, may be replaced by a magnet with poles on its inner circumference and the end face like magnet 45. Such an arrangement would be particularly suitable for an anti-friction bearing 15 in the form of an elongated roller bearing. It will be understood that the designation "anti-friction bearing" herein comprehends ball bearings and all types of roller bearings, plain, tapered, and self aligning.

In the foregoing specification I have described presently preferred embodiments of my invention; however, it will be understood that my invention can be otherwise embodied within the scope of the following claims.

I claim:

1. A bearing for conveyor rolls or the like adapted to fit within a conveyor roll shell comprising coaxial inner and outer bearing elements spaced apart to provide a bearing cavity between their bearing surfaces, a fluid lubricant containing particles of magnetizable material disposed in the bearing cavity, and permanent magnet lubricating means disposed adjacent the bearing elements but separate therefrom and outside the bearing cavity to establish flux paths between the bearing elements and across the bearing cavity so as to distribute the lubricant uniformly over the bearing surfaces within the bearing cavity by magnetic attraction of the lubricant.

2. Apparatus of claim 1 in which the magnet means comprise an annular permanent magnet having two coaxial annular poles on one end adjoining one end of the bearing, one pole opposite each bearing element.

3. Apparatus of claim 2 in which the bearing elements comprise an anti-friction bearing.

4. Apparatus of claim 2 in which the bearing elements comprise a journal bearing.

5. Apparatus of claim 2 in which the pole of the magnet opposite one bearing element abuts that element and the pole of the magnet opposite the other element is spaced therefrom sufficiently to permit relative rotation therebetween.

6. Apparatus of claim 1 in which the bearing elements comprise a journal bearing and the magnetic means comprise a permanent magnet embedded in a bearing element.

7. Apparatus of claim 6 in which the permanent magnet is a high magnetic field intensity magnet.

8. Apparatus of claim 6 including a shaft carrying the inner bearing element and in which the permanent magnet is embedded in the shaft centrally of the bearing cavity.

9. Apparatus of claim 8 in which the permanent magnet is magnetized crossways of the shaft.

10. Apparatus of claim 6 in which the axial length of the permanent magnet poles is substantially that of the bearing cavity.

11. Apparatus of claim 1 including, in combination, an assembly comprising a housing enclosing the outer bearing element and a shaft through the inner bearing element, and means within the assembly attached to one element thereof adapted to form a dynamic barrier with the other element of the assembly so as to exclude foreign substances from the bearing.

12. Apparatus of claim 11 including a bore in the shaft extending from an outside end of the shaft to the bearing elements adapted to conduct lubricant to those elements.

13. Apparatus of claim 11 including a bore in the housing extending from the outside thereof to the bearing element adapted to conduct lubricant thereto.

14. Apparatus of claim 11 in which the barrier means are permanent magnet means coacting with the fluid lubricant between the permanent magnet means and the other element of the assembly to form a barrier by magnetic attraction of the lubricant means.

15. Apparatus of claim 14 in which the permanent magnet lubricating means and the permanent magnet barrier means comprise a single annular permanent magnet adjacent the bearing having two coaxial annular poles on its end face adjoining the bearing, one pole opposite each bearing element, and at least one pair of annular poles on its circumference adjoining the other element of the assembly.

* * * * *